(12) United States Patent
Benson et al.

(10) Patent No.: US 7,684,813 B2
(45) Date of Patent: Mar. 23, 2010

(54) METHOD AND APPARATUS FOR ESTABLISHING DIRECT COMMUNICATION FOR MOBILES IN A RADIO COMMUNICATION SYSTEM

(75) Inventors: Maya Benson, Swindon (GB); Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 518 days.

(21) Appl. No.: 10/696,042

(22) Filed: Oct. 29, 2003

(65) Prior Publication Data

US 2004/0121766 A1 Jun. 24, 2004

(30) Foreign Application Priority Data

Dec. 23, 2002 (GB) ................................. 0229731.5

(51) Int. Cl.
*H04B 7/00* (2006.01)

(52) U.S. Cl. .................... 455/517; 455/425; 455/67.11; 455/502; 455/519; 455/41.2; 370/338; 370/328; 370/332

(58) Field of Classification Search ................. 455/509, 455/41.2, 425, 421, 426.1, 517–519, 11.1, 455/67.11; 370/337–338, 332; 375/146
See application file for complete search history.

(56) References Cited

U.S. PATENT DOCUMENTS

| 5,666,661 A * | 9/1997 | Grube et al. ................ 455/509 |
| 5,748,621 A * | 5/1998 | Masuda et al. .............. 370/337 |
| 5,771,463 A * | 6/1998 | Lehmusto et al. ........... 455/524 |
| 5,822,682 A * | 10/1998 | Schroderus et al. ........ 455/63.3 |
| 5,903,618 A * | 5/1999 | Miyake et al. .............. 375/356 |
| 5,907,794 A * | 5/1999 | Lehmusto et al. .......... 455/11.1 |
| 5,949,776 A * | 9/1999 | Mahany et al. .............. 370/338 |
| 5,995,500 A * | 11/1999 | Ma et al. ..................... 370/337 |
| 6,289,218 B1 * | 9/2001 | Liu ........................ 455/426.1 |
| 6,415,146 B1 * | 7/2002 | Capece ....................... 455/517 |
| 6,456,613 B1 * | 9/2002 | Kato ........................... 370/347 |
| 6,549,778 B1 * | 4/2003 | Mulford .................. 455/426.1 |
| 6,650,629 B1 * | 11/2003 | Takahashi et al. ........... 370/335 |

(Continued)

FOREIGN PATENT DOCUMENTS

EP  1089586 A1  4/2001

(Continued)

OTHER PUBLICATIONS

3G TR 25.924 V1.0.0 (Dec. 1999) Technical Report, 3rd Generation Partnership Project; Technical Specification Group Radio Access Network; Opportunity Driven Multiple Access (3G TR 25.924 version1.0.0).*

(Continued)

*Primary Examiner*—Sharad Rampuria
(74) *Attorney, Agent, or Firm*—Gary J. Cunningham

(57) ABSTRACT

A radiotelephone method includes detecting other mobile stations and identifying possible relay candidates among the other mobile stations. The method then includes communicating information about the candidates to a base station. Communication with a second mobile station is requested of the base station at a first mobile station. If the first mobile station and the second mobile station are physically close, the base station instructs the first mobile station and the second mobile station to establish direct communication.

11 Claims, 3 Drawing Sheets

U.S. PATENT DOCUMENTS

| | | | |
|---|---|---|---|
| 6,665,521 B1 * | 12/2003 | Gorday et al. | 455/67.11 |
| 6,744,750 B1 * | 6/2004 | Berger | 370/337 |
| 6,865,371 B2 * | 3/2005 | Salonidis et al. | 455/41.1 |
| 6,865,372 B2 * | 3/2005 | Mauney et al. | 455/41.2 |
| 6,894,992 B1 * | 5/2005 | Morvan et al. | 370/329 |
| 6,961,575 B2 * | 11/2005 | Stanforth | 455/445 |
| 6,983,162 B2 * | 1/2006 | Garani et al. | 455/518 |
| 7,013,158 B1 * | 3/2006 | Cook | 455/519 |
| 7,058,419 B2 * | 6/2006 | Kotzin et al. | 455/518 |
| 7,096,025 B2 * | 8/2006 | Phang et al. | 455/445 |
| 7,190,961 B2 * | 3/2007 | Burr | 455/502 |
| 7,254,615 B2 * | 8/2007 | Taib et al. | 709/209 |
| 7,286,841 B2 * | 10/2007 | Sun et al. | 455/502 |
| 7,333,824 B2 * | 2/2008 | Zhang et al. | 455/502 |
| 7,394,798 B2 * | 7/2008 | Naghian | 370/338 |
| 7,400,894 B2 * | 7/2008 | Ebner et al. | 455/502 |
| 7,424,541 B2 * | 9/2008 | Bourne | 709/227 |
| 7,444,170 B2 * | 10/2008 | Karabinis | 455/562.1 |
| 2001/0036810 A1 * | 11/2001 | Larsen | 455/11.1 |
| 2002/0151320 A1 * | 10/2002 | Wasenius | 455/518 |
| 2003/0013471 A1 * | 1/2003 | Vilmur et al. | 455/513 |

FOREIGN PATENT DOCUMENTS

| | | |
|---|---|---|
| EP | 1089586 A2 * | 4/2001 |
| GB | 2368494 A * | 5/2002 |
| WO | WO 96/22663 | 7/1996 |
| WO | WO 99/04514 | 1/1999 |
| WO | WO 01/15387 A1 | 3/2001 |

OTHER PUBLICATIONS

3G TR 25.924 V1.0.0 (Dec. 1999) Technical Report, $3^{rd}$ Generation Partnership Project; Technical Specification Group Radio Access Network; Opportunity Driven Multiple Access (3G TR 25.924 version 1.0.0), 13 pages.

* cited by examiner

METHOD AND APPARATUS FOR ESTABLISHING DIRECT COMMUNICATION FOR MOBILES IN A RADIO COMMUNICATION SYSTEM

BACKGROUND

The present invention relates generally to radiotelephone systems. More particularly, the present invention relates to methods and apparatus for establishing direct communication among physically close mobile stations in a radiotelephone system using Opportunity Driven Multiple Access protocol.

A variety of radiotelephone systems have been developed for providing communication service between mobile stations and base stations. Radiotelephone systems generally include cellular telephone systems, personal communication systems (PCS), trunked radio systems and other similar radio systems. In such a system, one or more base stations provide two-way radio communication service to mobile stations operated by subscribers and located in the geographic area served by the base station. As a mobile station is powered up or newly moves into a base station's coverage area, the mobile station registers with the base station, including identifying itself and its capabilities. As a mobile station moves among geographic areas, communication between the mobile station and a base station is handed off to other base stations. Such systems typically also include a mobile switching center to control handoff operations and traffic routing in the system.

Radiotelephone systems permit radio communication of voice and data between mobile stations and between mobile stations and the public switched telephone network. However, mobile-to-mobile communications have heretofore been completed through a base station. To initiate a call to another mobile station in the system, a calling subscriber at an originating mobile station initiates a radio link with its serving base station, which is generally the geographically closest base station. The originating mobile station sends a call request to the base station. The call request includes identification information such as a mobile identification number for the called mobile station, or terminating mobile station.

The base station then locates the terminating mobile station in the system. The base station may consult with the mobile switching center to learn with which base station the terminating mobile station last registered. If the terminating mobile station is registered with the base station itself, the base station sends a page to the terminating mobile station. The page is a radio communication with predetermined timing and content inviting the terminating mobile station to respond to begin two-way communication. The terminating mobile station then responds and the base station completes the call between the calling subscriber at the originating mobile station and the called subscriber at the terminating mobile station. Typically, either the calling subscriber or the called subscriber or both are billed for the time during which the call is underway.

In current systems, this process is followed even if the two mobile stations are in close physical proximity, close enough for reliable radio contact. The two-way communication between the two mobile stations requires two two-way radio links. A first link is maintained between the originating mobile station and the base station. A second link is maintained between the base station and the terminating mobile station.

In cases where mobile stations are physically close together, this is wasteful of system resources. If direct mobile to mobile communication was possible, the two base station radio links would be freed up for use by other mobiles, improving utilization of system resources. Moreover, the mobiles could operate at reduced transmit power, reducing radio frequency noise in the system for other base stations and other mobiles. Still further, since system resource usage is reduced by removing the base station from the communication link, alternative pricing options could be offered for subscribers.

Accordingly, there is a need for improved method and apparatus for mobile to mobile communication in a radiotelephone system.

DETAILED DESCRIPTION OF THE PRESENTLY PREFERRED EMBODIMENTS

Figure 1:
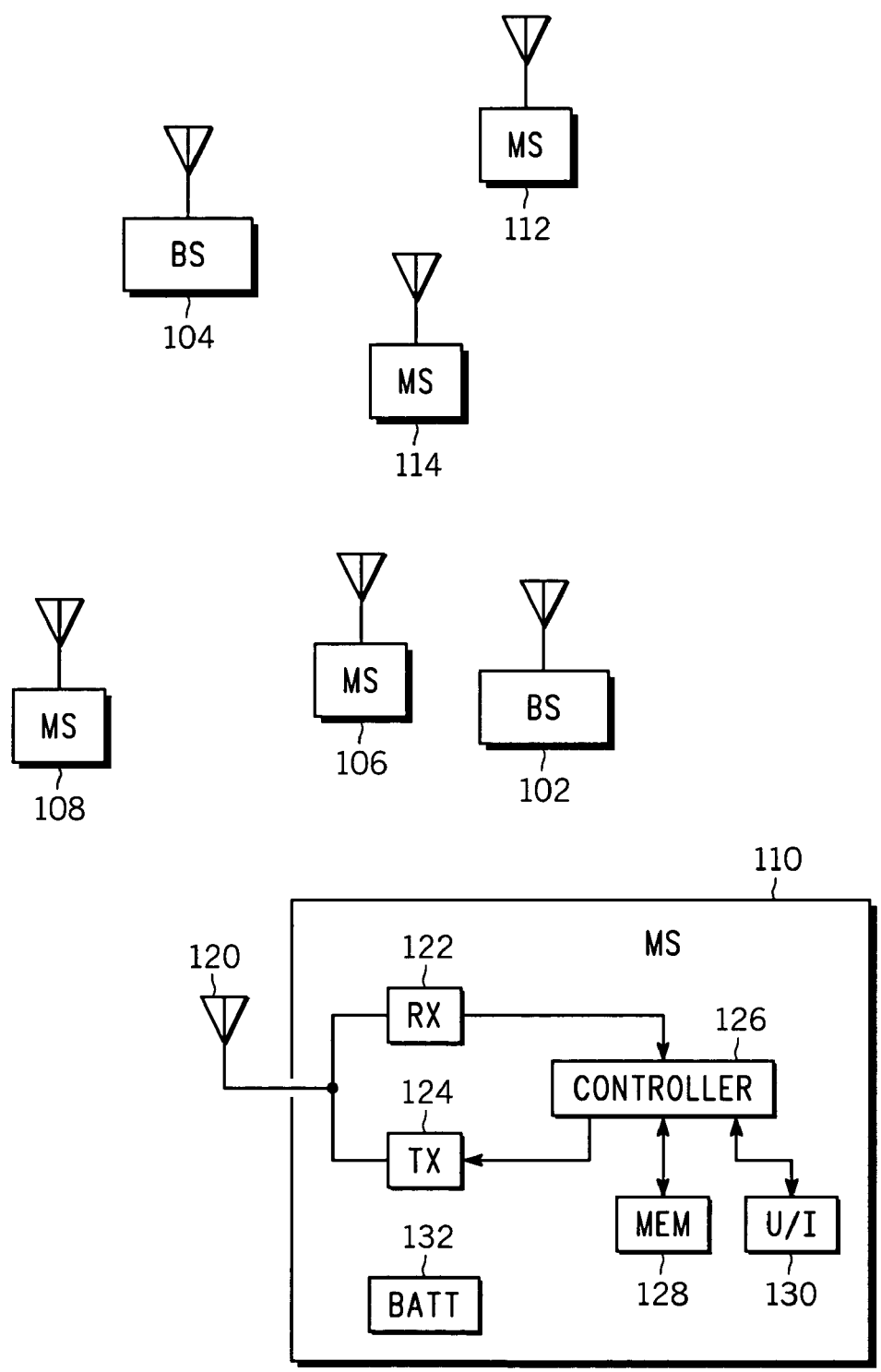
FIG. 1 is a block diagram of a radiotelephone system.

Referring now to the drawing, FIG. 1 is a block diagram of a radiotelephone system 100. The radiotelephone system may be any cellular system, personal communications system, trunked radio system or any other type of radio system. In an exemplary embodiment, the radiotelephone system 100 is a Universal Mobile Telecommunications System (UMTS) as specified by the Third Generation Partnership Project. Radio communication in the exemplary radiotelephone system is selectively time division duplex (TDD) and frequency division duplex (FDD). The radiotelephone system 100 is an example of a public land mobile network (PLMN).

The radiotelephone system 100 includes a plurality of base stations 102, 104, and a plurality of mobile stations. Each base station 102, 104 provides radio communication service to mobile stations in the geographic vicinity of the base station. Thus, in the embodiment of FIG. 1, base station 102 provides radio communication service to mobile stations 106, 108, 110 and base station 104 provides radio communication service to mobile stations 112, 114. A two-way radio link is established between a mobile station and one or more base stations. As a mobile station enters the area served by the base station, the mobile station registers with the base station, so that the mobile station may be locate for paging. As mobile stations move geographically, radio communication is handed off from base station to base station. The system 100 may further include a mobile switching center for controlling system-level operations such as handoff.

Mobile station 110 illustrates an exemplary embodiment of a mobile station of the system 100. The mobile station 110 may also be referred to as a mobile, portable, handheld, user equipment (UE) or radiotelephone. The mobile station 110 includes an antenna 120, a receiver 122, a transmitter 124, a controller 126, memory 128, user interface 130 and battery 132.

The antenna 120 transforms electromagnetic energy to electrical signals provided to the receiver 122, and transforms electrical signals from the transmitter 122 to electromagnetic energy for transmission to remote radio receivers. The receiver 122 responds to the electrical signals from the antenna 120 to produce detected data for the controller 126. The receiver 122 may include circuits such as filters and demodulators. The transmitter 124 responds to formatted data from the controller to provide the electrical signals to drive the antenna 120. The transmitter 124 may include circuits such as modulators and filter. The antenna 120, the receiver 122 and the transmitter 124 together form a radio communication circuit for two-way radio communication with remote radio devices such as the base station 102.

The controller 126 controls operation of the radiotelephone 110. The controller 126 may be implemented as a processor, microprocessor, digital signal processor (DSP) or any other logic circuit or combination of circuits providing control functions. The controller 126 operates in response to data and program instructions stored in the memory 128. In one mode, the controller 126 controls the radio communication circuit by directing the tuning, activation and deactivation of the circuit. The user interface 130 provides user control of the radiotelephone 110. In typical embodiments, the user interface 130 includes a keypad, a display screen, a microphone and a speaker. The battery 132 provides operating power for the radiotelephone 110.

In accordance with the presently disclosed embodiment, the mobile stations including the mobile station 110 can operate in a variety of modes. One mode is idle mode. When a mobile station such as the mobile station 110 is switched on, it attempts to make contact with a public land mobile network (PLMN) such as the radiotelephone system 100. The mobile station looks for a suitable cell of the chosen PLMN and chooses that cell to provide available services, and tunes to its control channel. This choosing is known as "camping on the cell," and the mobile station is operating in idle mode. The mobile station will then register its presence, by means of a registration procedure, in the registration area of the chosen cell, if necessary.

In another operating mode, the mobile stations including the mobile station 110 may operate in a connected mode. In this mode, an active two-way radio link is maintained between the mobile station and one or more base stations. Voice and data transmission can occur and handoff can occur if the mobile stations travel among the geographic areas served by the base stations. In a UMTS-FDD system, idle mode and connected mode correspond to FDD operation. TDD is also part of UMTS.

Another operating mode for the mobile stations is relay mode. In this mode, the mobile station communicates directly with other mobile stations. The mobile station operates as a repeater, receiving radio signals from a data source and relaying the radio signals to a radio destination. Any number of mobile stations may be chained together in this manner.

One example of a specification for a UMTS radio operating in relay mode is known as Opportunity Driven Multiple Access (ODMA). An ODMA mobile station communicates via its neighbors using intelligent subscriber relay. A fundamental of the ODMA philosophy is that communications is considered as a dynamic, localized activity best controlled at node level, rather than from some centralized intelligence such as a base station or mobile switching center.

The choice of modulation scheme is not critical to ODMA. Transmission is completely packet based and connectionless and each mobile station is able to relay packets from its neighbors. Furthermore, a mobile station will adapt on a packet by packet basis its transmission route, power, data rate, packet length, frequency, time window and voice quality over a wide dynamic range.

Each mobile station in ODMA has responsibility and, to a large degree, autonomy for local routing and optimal adaptation to the communication environment, although it will accept the authority of a network supervisor such as a base station or mobile switching center.

When in the ODMA mode, the mobile station initiates or continues to evaluate the relay link to other radios via a process known as probing. Probing is a mechanism used by the ODMA relay node to build a neighbor list which should contain at least a minimum number of neighbors. The probing activity levels of an ODMA relay node may also be influenced by a number of system parameters such as the number of neighbors, gradient information and path loss to neighbors.

In accordance with one embodiment of the radiotelephone system 100, mobile stations detect possible relay candidates and report on these to the base station. The detection is preferably in accordance with the ODMA probing process, but other monitoring techniques. For example, the mobile station could monitor uplink transmissions from adjacent mobiles. The uplink is the radio link for transmission from the mobile station to the base station. Detected relay candidates are added to a relay candidate list. From time to time, information about the relay candidate list is transmitted to the base station, for example, in a process that is similar to handover candidate reporting.

In order to better utilize system resources, the present embodiment provides for detecting if mobile stations which are trying to establish communication with each other are physically close to each other. If so, the ODMA protocol or another relay mode may be used to establish direct communication between the mobile stations.

Thus, a mobile station M1 requests communication with a mobile station M2. The mobile station M1 transmits a request to its serving base station identifying mobile station M2 as a target. From the relay candidate list reported by mobile station M1, the base station detects that mobile stations M1 and M2 are physically close together and instructs them to establish direct communications.

In accordance with this embodiment, the mobile stations such as mobile station 110 are adapted for communication both in idle and connected modes with a remote base station, and in relay mode with other mobile stations or a base station or other radios. The radio communication circuit of the mobile station is configured for two-way radio communication with remote radio devices, such as base stations and other radios acting as repeaters in relay mode. The controller 126 is configured to control the radio circuit. First, the controller controls the radio circuit to establish a radio link to a remote base station and convey a request for communication with another mobile station or radiotelephone. The radio circuit receives over the radio link a direct communication instruction, instructing the mobile station to enter the relay mode. The controller 126 then controls the radio communication circuit to interrupt the radio link to the remote base station and establish a relay radio link with the target mobile station.

In another embodiment, the base station will instruct the first mobile station and the second mobile station to establish direct communication if the radio propagation conditions between the first mobile station and the second mobile station are sufficiently good for direct communication. The base station may obtain information about the radio propagation conditions from any suitable source, such as receiving updates about the radio propagation conditions from the first or second mobile stations or both mobile stations, or by using the relay candidate lists of one or both mobile stations. The mobile stations can use any suitable signal quality evaluation technique, such as received signal strength indication, signal to noise ratio or bit error rate to determine if propagation conditions are sufficiently good between the first mobile station and the second mobile station.

Figure 2:
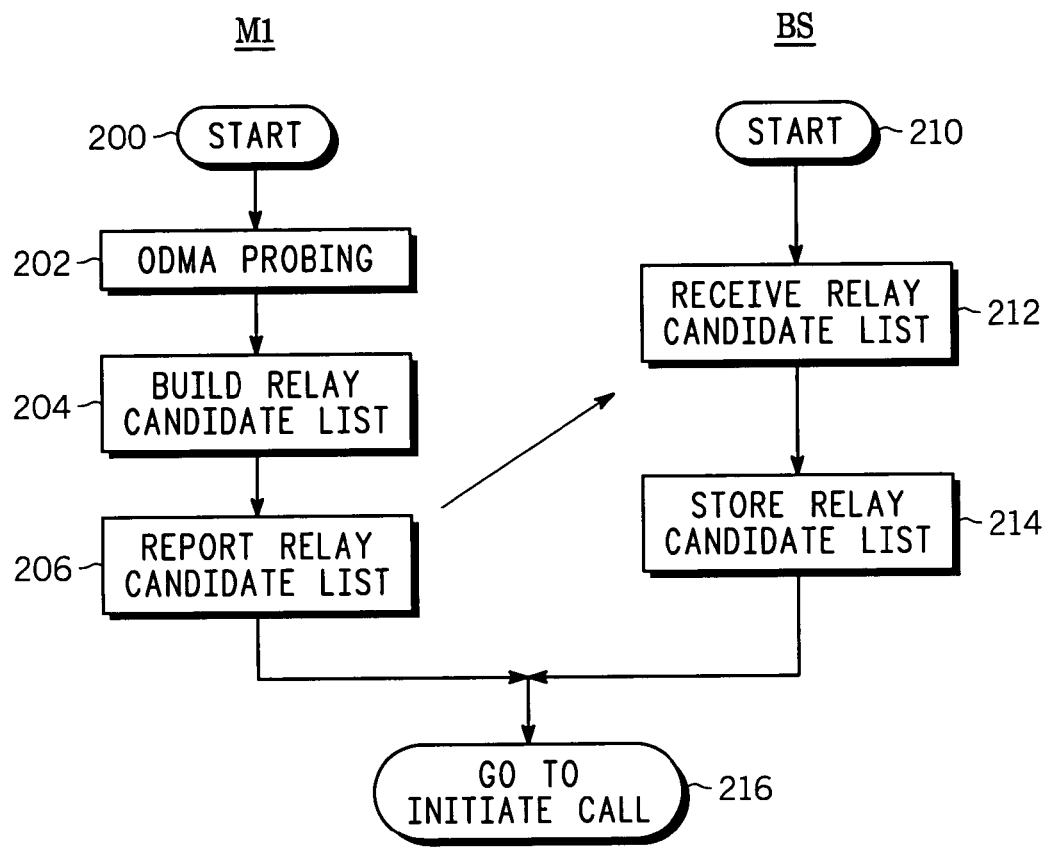
FIGS. 2 and 3 are flow diagrams illustrating a method of operating the radiotelephone system of FIG. 1.

FIG. 2 is a flow diagram illustrating a method of operating the radiotelephone system 100 of FIG. 1. FIG. 2 illustrates interaction between a mobile station M1 and its associated base station BS. Operation at the mobile station M1 begins at block 200. At block 202, the mobile station M1 detects possible relay candidates. At block 204, the detected candidates are added to a relay candidate list, stored, for example, in the memory of the mobile station M1.

In one embodiment, detecting possible relay candidates is accomplished by the ODMA probing process, as the mobile station populates its neighbor list of mobiles in relay communication with the mobile station. In other embodiments, the mobile station M1 can monitor uplink transmissions from adjacent mobiles and measure parameters of such transmissions, such as received signal strength. The decision to add a mobile to the candidate list is based on parameters exceeding predetermined threshold values. In general, the decision to add a mobile to the candidate list reflects a determination that the radio propagation conditions between the mobile stations are sufficiently good for direct communication. Any suitable information about the detected mobile station may be stored in the relay candidate list. One example is the mobile identity number which uniquely identifies the transmitting mobile station.

At block 206, the mobile station reports its relay candidate list to the base station BS. In some embodiments, reporting the relay candidate list may include or be replaced by reporting on the radio propagation conditions between the mobile stations and other mobile stations. The report may simply be an indication that radio propagation conditions are sufficiently good for direct communication between the first mobile station and another specified mobile station. The presence of another mobile station on the relay candidate list may imply that conditions are sufficiently good. Operation at the base station BS begins at block 210 and at block 212, the base station BS receives the relay candidate list. The relay candidate list is communicated from the mobile station M1 to the base station by establishing a two-way radio link. In a UMTS-FDD, this is done in FDD mode, with the mobile station M1 communicating on an uplink frequency band and the base station BS communicating on a downlink frequency band.

At block 214, the base station BS stores the received relay candidate list from the mobile station M1. The BS conventionally includes a large memory for storing data related to system operation. Stored data includes relay candidate lists and handoff candidate lists from mobile stations in the geographic area served by the base station. At block 216, control proceeds to block 300, FIG. 3, labeled initiate call.

Figure 3:
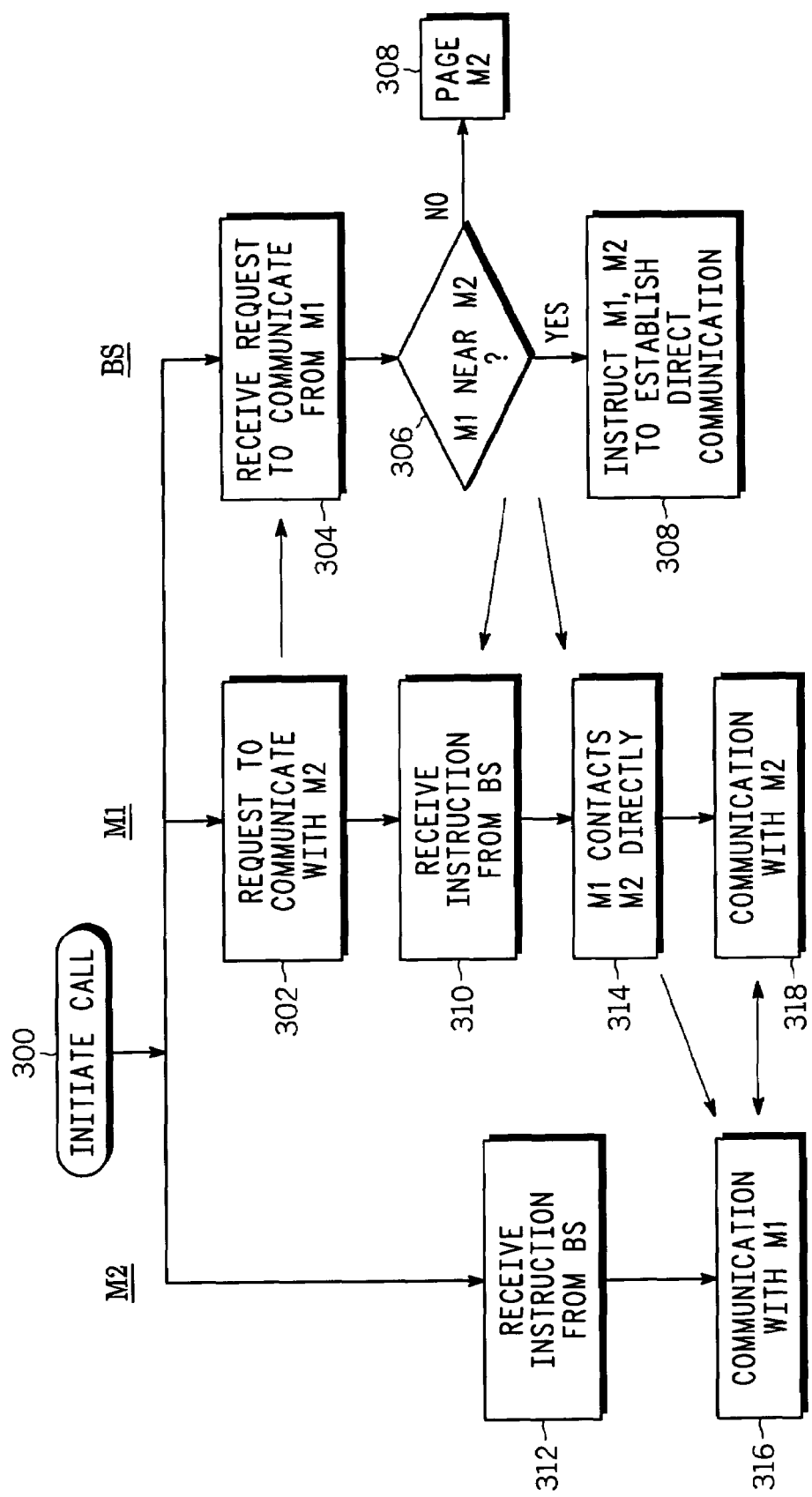

FIG. 3 is a flow diagram illustrating operation of the radiotelephone system of FIG. 1. FIG. 3 illustrates interaction among a first mobile station M1, a second mobile station M2 and a base station M2. After the relay candidate list of the mobile station M1 is sent to the base station BS, for example as described above in conjunction with FIG. 2, control begins at block 300.

At block 304, the mobile station M1 requests communication with mobile station M2. This is accomplished by mobile station M1 establishing a two-way radio link with the base station BS. For example, the mobile station M1 may transmit identification information and a request to initiate a call, identifying its own mobile identification number and the mobile identification number of the second mobile station M2. This request is received at the base station BS at block 304. An acknowledgement may be sent in return.

At block 306, the base station determines if the mobile station M1 and the mobile station M2 may enter direct communication. This may be done by determining if the first mobile station M1 and the second mobile station M2 are physically close together. This in turn may be done in any suitable manner. In one embodiment, the base station BS retrieves the relay candidate lists for both mobile station M1 and mobile station M2. If the relay candidate list for first mobile station M1 lists second mobile station M2, the first mobile station M1 has recently detected a transmission from the second mobile station M2. Similarly, if the relay candidate list for second mobile station M2 lists first mobile station M1, the second mobile station M2 has recently detected a transmission from the first mobile station M1. In this case, the relay candidate lists are mutually inclusive, and the base station BS may determine that the two mobile stations M1, M2 are physically close together.

In contrast, if the relay candidate list for first mobile station M1 does not list the second mobile station M2, the first mobile station M1 has not recently detected a transmission from the second mobile station M2. Similarly, if the relay candidate list for the second mobile station M2 does not list first mobile station M1, the second mobile station M2 has not recently detected a transmission from the first mobile station M1. In this case, the relay candidate lists are mutually exclusive, and the base station BS may determine that the two mobile stations M1, M2 are not physically close together.

For the intermediate case, where the base station BS determines that the relay candidate list of only one mobile station includes the other mobile station, the result is indeterminate. The base station BS may review other parameters or may decide that the two mobile stations are not physically close together.

As indicated, other proximity tests may be used. In some systems, precise location information is available, such as where mobile stations are equipped with Global Positioning System (GPS) receivers or where the base stations of the system perform some sort of triangulation or time of flight estimate of mobile position. In this case, the base station compares the geographic data, determines a separation distance or by some other convenient measure, determines if the two mobile stations are physically close.

Another proximity test may simply involve a determination if the mobile stations M1, M2 are in the same cellular coverage sector of the base station BS. That information is available from registration information obtained when the mobile stations last registered with the base station and the system. If the mobile stations are in the same sector, the base station may determine that the two mobile stations are physically close.

Another way for the base station BS to determine if the mobile stations M1, M2 may be placed in direct communication is for the base station BS to determine if the radio propagation conditions between the base stations M1, M2 are sufficiently good. This may be done, for example, by using information reported by one or both of the mobile stations about the current radio propagation conditions, or by reference to the relay candidate lists of one or both mobile stations.

If, at block 306, the base station BS determines that the mobile stations M1, M2 are not physically close, the base station BS will page the second mobile station in the conventional fashion. The base station BS will consult the location register or other system resource defining the last registered location for the second mobile station M2. The mobile station M2 will be paged at that location and, if it answers the page, the call will be routed to mobile station M2. A radio link will be established from the base station BS or other serving base station of the network and the call will be completed. In that case, a first two-way radio link will be established during the call from the first mobile station M1 to the base station BS and a second two-way radio link will be established during the call from the serving base station to the second mobile station M2.

On the other hand, if at block 306, the base station determines that the mobile stations M1, M2 are physically close or that radio propagation conditions are sufficiently good, the base station BS will instruct the first mobile station M1 and the second mobile station M2 to establish direct communication. In one embodiment, this is accomplished by initiating a first communication link between the base station BS and the first mobile station M1 and communicating a direct communication instruction to the first mobile station M1. The first mobile station M1 receives the direct communication instruction at block 310. This is further accomplished by initiating a second communication link between the base station BS and the second mobile station M2 and communicating a direct communication instruction to the second mobile station M2. The second mobile station M2 receives the direct communication instruction at block 312. After communicating the direct communication instruction, the base station BS terminates the first communication link and the second communication link, freeing up the base station resources required for maintaining those radio links.

The direct communication instruction may be any suitable data or other information required to cause the mobile stations M1, M2 to communicate directly. For example, the direct communication instruction may define the other mobile station involved in the direct communication session by mobile identification number and may further define the direct communication session by frequency and time slot assignments and some priority between the two mobiles.

In the embodiment of FIG. 3, at block 314, the first mobile station M1 contacts the second mobile station M2 directly. This may be done using ODMA relay protocol, where available, or using any other convenient mobile-to-mobile communication scheme. At blocks 316, 316, the two mobile stations continue their direct communication session. In an ODMA environment, a connectionless, packet oriented communication session is maintained. If the direct relay communication is a voice telephone call, the two mobile stations may allocate their resources so that the conversation is clearly conveyed even in the packet-oriented environment. For example, other relay operations with other mobiles station may be discontinued or forbidden during the call.

Subsequent to initiation of the call in the relay mode between the first mobile station M1 and the second mobile station M2, it may become necessary to hand off the call from the relay mode to connected mode. In this case, one or both of the mobile stations will generate a handoff request and transmit the handoff request to the base station BS. In this case, the base station BS must resume normal cellular communications with both mobile stations. Therefore, the base station BS initiates a first radio link with the first mobile station M1, entering the connected mode with the first mobile station M1, and the base station BS initiates a second radio link with the second mobile station M2. The base station BS then connects the call over the first radio link and the second radio link.

From the foregoing, it can be seen that the present embodiments provide an improved method for direct mobile-to-mobile communication. Mobile stations possessing a relay capability such as that provided by the Opportunity Directed Multiple Access protocol establish a direct link under supervision of the base station, but without continuous access to base station resources. Therefore, this technique can save downlink resources, since the base station is only involved in instructing the mobiles to go into direct communications mode. Moreover, direct communications between mobiles can be low power, thus conserving battery power in the mobile station. Still further, there may be user billing advantages if the network operator offers the direct communications mode as a lower cost option to standard cellular, connected mode communications.

While a particular embodiment of the present invention has been shown and described, modifications may be made. For example, if the two mobiles are in general proximity but not in absolute proximity, the base station may enlist other intervening mobiles as repeaters between the two endpoint mobile stations. It is therefore intended in the appended claims to cover such changes and modifications which follow in the true spirit and scope of the invention.

The invention claimed is:

1. A method for operating a radiotelephone system, the method comprising:
 at one or more mobile stations of the radiotelephone system, detecting other mobile stations to which radio propagation conditions are sufficiently good;
 at the one or more mobile stations, communicating information about the detected mobile stations to a base station of the radiotelephone system;
 at a first mobile station, after the detecting the other mobile stations to which the radio propagation conditions are sufficiently good and after the communicating the information about the detected mobile stations, requesting communication with a second mobile station;
 at the base station, if the radio propagation conditions between the first mobile station and the second mobile station are sufficiently good, instructing the first mobile station and the second mobile station to establish direct communication; and
 at the first mobile station, in response to the instruction to establish direct communication, entering a packet-based connectionless communication mode with the second mobile station, wherein the packet-based connectionless communication mode comprising entering an Opportunity Driven Multiple Access relay mode,
 wherein the instruction step includes:
 initiating a first communication link between the base station and the first mobile station;
 communicating a direct communication instruction to the first mobile station;
 initiating a second communication link between the base station and the second mobile station;
 communicating a direct communication instruction to the second mobile station; and
 terminating the first communication link and the second communication link.

2. The method of claim 1 further comprising:
 at the base station, receiving the communication request from the first mobile station; and
 from the information about the detected mobile stations from the first mobile station and the second mobile station, determining if the first mobile station and the second mobile station may initiate direct communication.

3. The method of claim 1 further comprising:
 determining if each of the first mobile station and the second mobile station is a detected mobile of the other mobile station.

4. The method of claim 2 further comprising:
 at the base station, determining a location of the first mobile station;
 determining a location of the second mobile station; and
 determining information about relative proximity of the first mobile station and the second mobile station based on the location of the first mobile station and the location of the second mobile station.

5. The method of claim 1 wherein detecting other mobile stations comprises:

detecting respective uplink transmissions from respective mobile stations to base stations of the radiotelephone system.

6. The method of claim 5 wherein detecting other mobile stations further comprises:
determining a received signal strength for a detected uplink transmission from a mobile station;
if the received signal strength exceeds a threshold, identifying the mobile station as a detected mobile station.

7. A method for operating a base station in a radiotelephone system, the method comprising:
receiving, from respective mobile stations of the radiotelephone system, information about relay candidates of the respective mobile stations;
storing the information in respective relay candidate lists;
after the receiving the information about the relay candidates and after the storing the information in the respective relay candidate lists, receiving a request from a first mobile station to initiate a call with a second mobile station in the radiotelephone system;
based at least in part on a relay candidate list associated with the first mobile station, determining if the second mobile station is physically close to the first mobile station; and
if so, instructing the first mobile station and the second mobile station to enter a relay mode for direct link communication; and
at the first mobile station, in response to the instruction to enter the relay mode for direct link communication, entering a packet-based connectionless communication mode with the second mobile station, wherein the packet-based connectionless communication mode comprising entering an Opportunity Driven Multiple Access relay mode,
wherein the instruction step includes: initiating a first communication link between the base station and the first mobile station; communicating a direct communication instruction to the first mobile station; initiating a second communication link between the base station and the second mobile station; communicating a direct communication instruction to the second mobile station; and terminating the first communication link and the second communication link.

8. The method of claim 7 wherein instructing the first mobile station and the second mobile station to enter a relay mode comprises:
communicating information about the relay mode over a first link with the first mobile station;
communicating information about the relay mode over a second link with the second mobile station; and
terminating both the first link and the second link.

9. The method of claim 7 further comprising:
receiving from respective mobile stations of the radiotelephone system information about relay candidates of the respective mobile stations;
storing the information in respective relay candidate lists; and
receiving updates from the respective mobile stations for updating the respective relay candidate lists.

10. A radiotelephone comprising:
a radio communication circuit configured for two-way radio communication with remote radio devices;
a controller configured to control the radio communication circuit;
means for detecting other radiotelephones to which radio propagation conditions are sufficiently good; and
a memory configured to store information about the detected radiotelephones in the relay candidate list,
wherein the controller is configured to control the radio communication circuit to establish a radio link to a remote base station to transmit the relay candidate list to the remote base station, and to transmit a request for communication with another radiotelephone and to receive over the radio link a direct communication instruction generated by the remote base station in dependence on the relay candidate list, and further configured to control the radio communication circuit to interrupt the radio link and establish a relay radio link with the another radiotelephone in response to the direct communication instruction; and further configured to, in response to the direct communication instruction, enter a packet-based connectionless communication mode with the another radiotelephone, wherein the packet-based connectionless communication mode comprises an Opportunity Driven Multiple Access relay mode;
wherein the base station instructs direct communication by:
initiating a first communication link between the remote base station and the radio communication circuit;
communicating a direct communication instruction to the radio communication circuit;
initiating a second communication link between the base station and the another radiotelephone;
communicating a direct communication instruction to the another radiotelephone; and
terminating the first communication link and the second communication link.

11. The radiotelephone of claim 10 wherein the controller is further configured to control the radio communication circuit to detect uplink radio transmissions from other radiotelephones and, in response to the detected uplink transmissions, to populate the relay candidate list.

* * * * *